A. T. BROWN.
COMPUTING MACHINE.
APPLICATION FILED APR. 6, 1917.

1,372,334.

Patented Mar. 22, 1921.
9 SHEETS—SHEET 1.

WITNESSES
Chas H Young.

INVENTOR.
Alexander T. Brown
BY Parsons + Bodell
ATTORNEYS.

A. T. BROWN.
COMPUTING MACHINE.
APPLICATION FILED APR. 6, 1917.

1,372,334.

Patented Mar. 22, 1921.
9 SHEETS—SHEET 2.

WITNESSES:
Chat H Young.

INVENTOR.
Alexander T. Brown.
BY Parsons & Bodell
ATTORNEYS.

A. T. BROWN.
COMPUTING MACHINE.
APPLICATION FILED APR. 6, 1917.
1,372,334.
Patented Mar. 22, 1921.
9 SHEETS—SHEET 3.
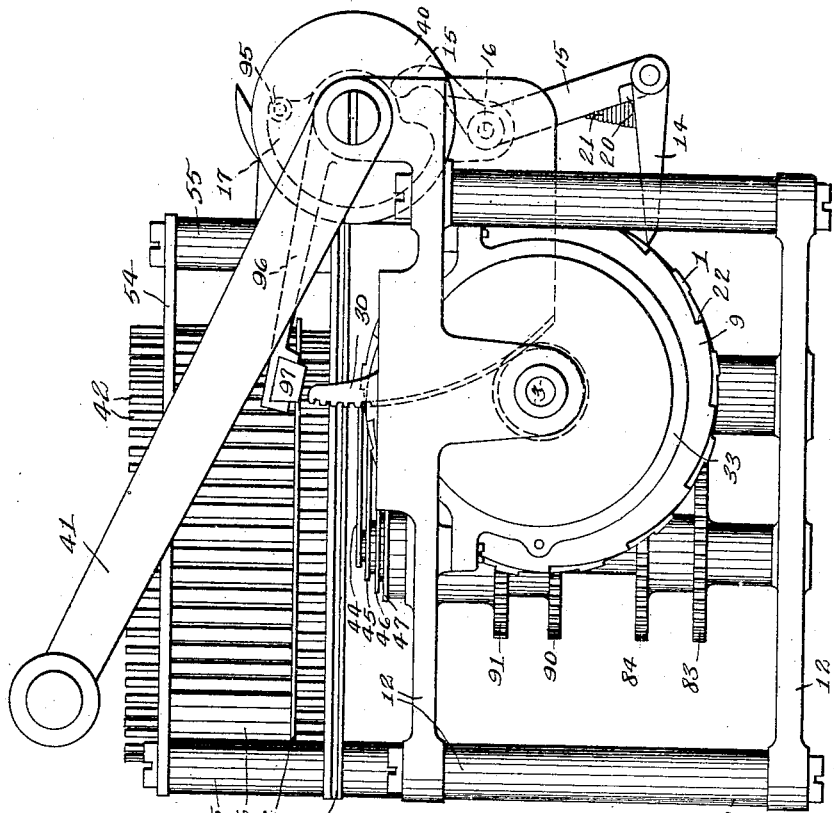
Fig. 3.
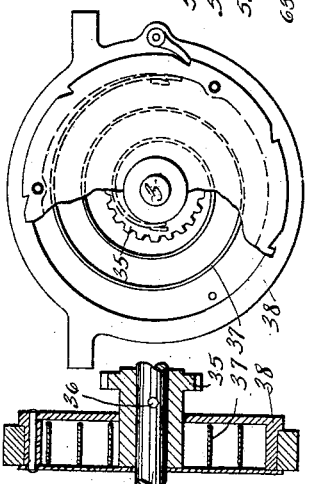
Fig. 24.
Fig. 26.
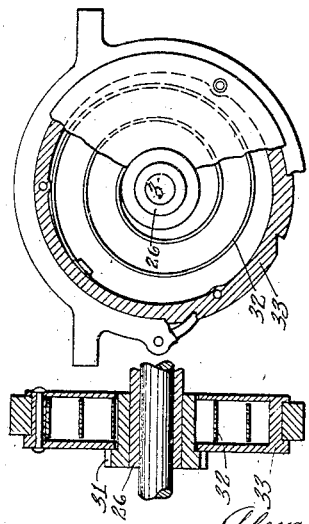
Fig. 25.
Fig. 27.
WITNESSES:
Chas H. Young
INVENTOR.
Alexander T. Brown
BY
Parsons & Barrell
ATTORNEYS.

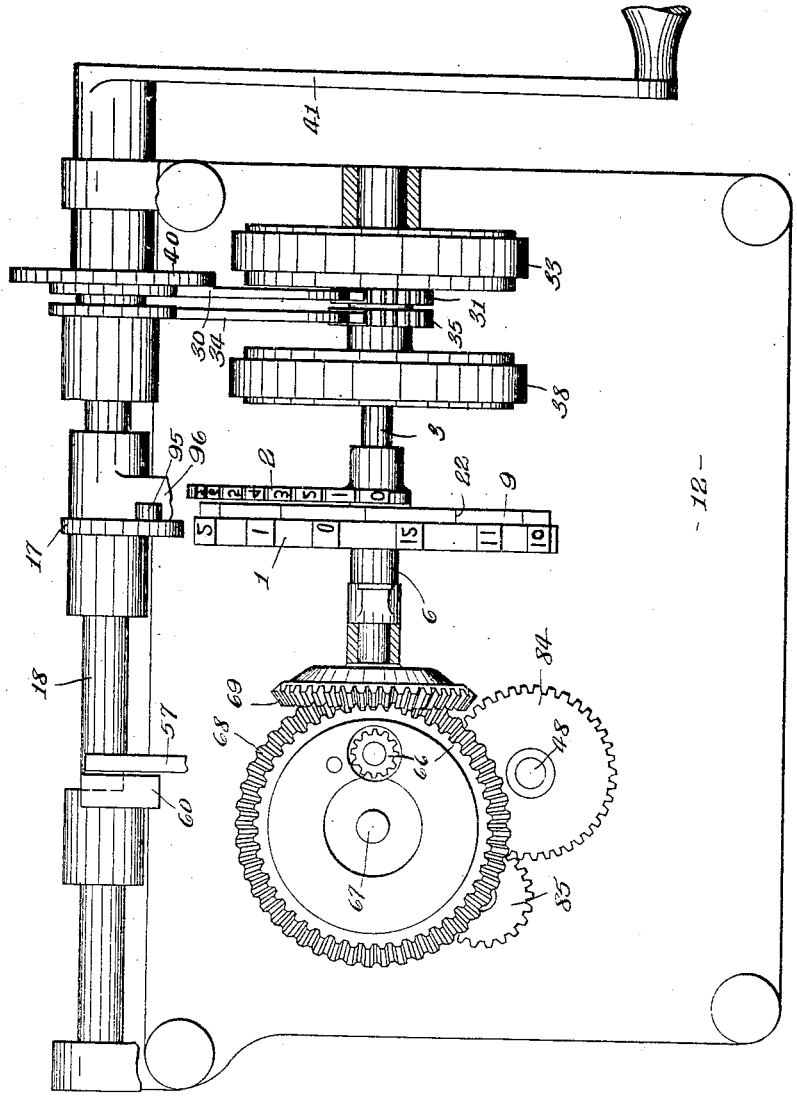

A. T. BROWN.
COMPUTING MACHINE.
APPLICATION FILED APR. 6, 1917.
1,372,334.
Patented Mar. 22, 1921.
9 SHEETS—SHEET 5.
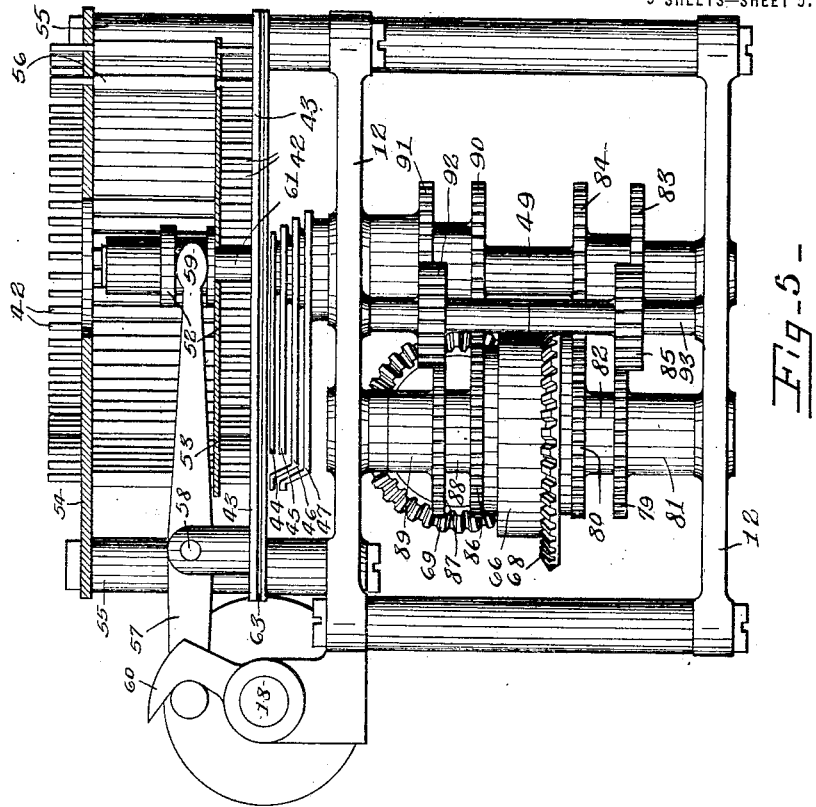
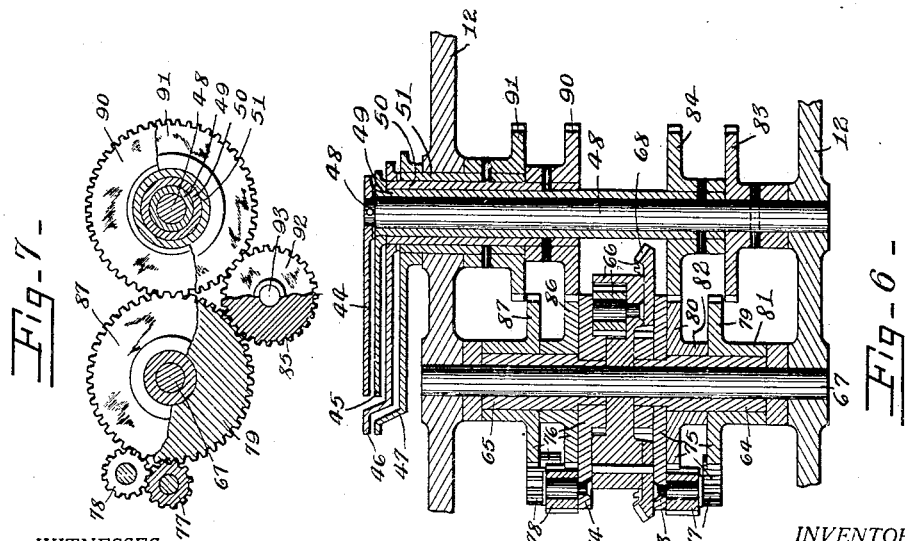
WITNESSES:
INVENTOR.
ATTORNEYS A. T. BROWN.
COMPUTING MACHINE.
APPLICATION FILED APR. 6, 1917.
1,372,334.
Patented Mar. 22, 1921.
9 SHEETS—SHEET 6.
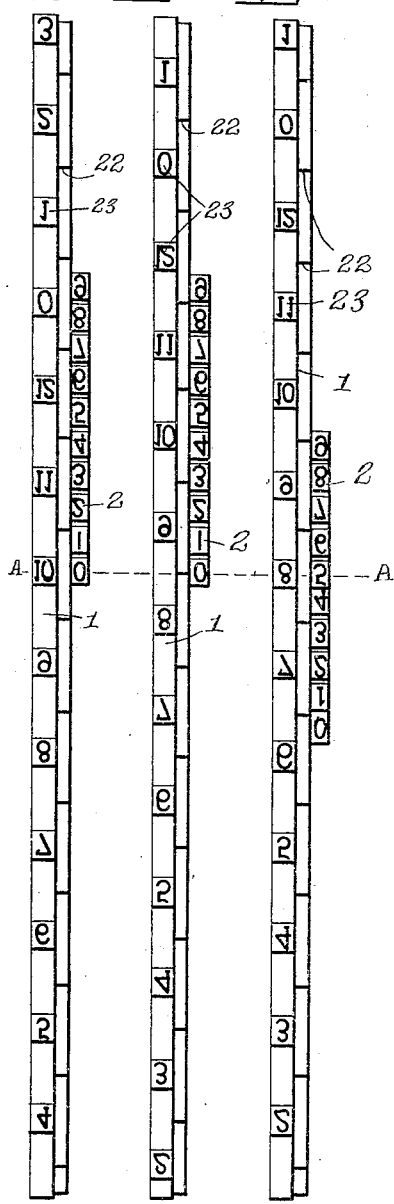
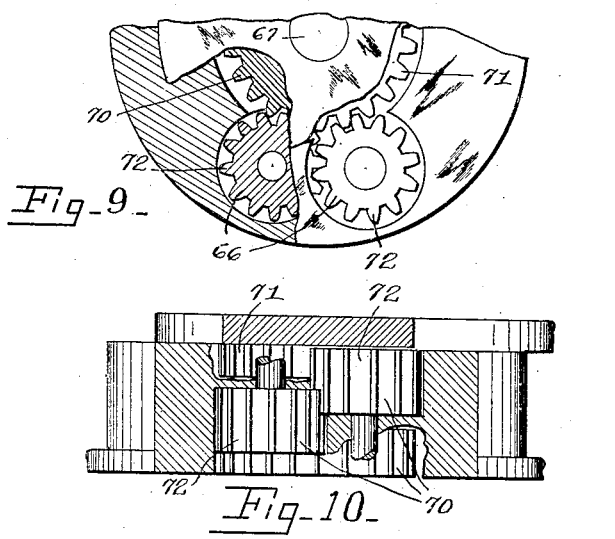
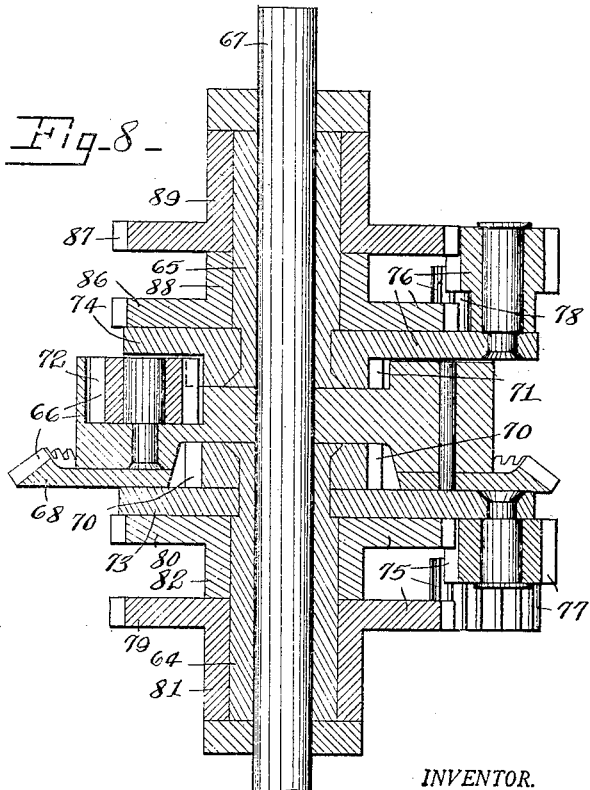
WITNESSES:
Chas H Young
INVENTOR.
Alexander T Brown
BY
Parsons + Bodell
ATTORNEYS.

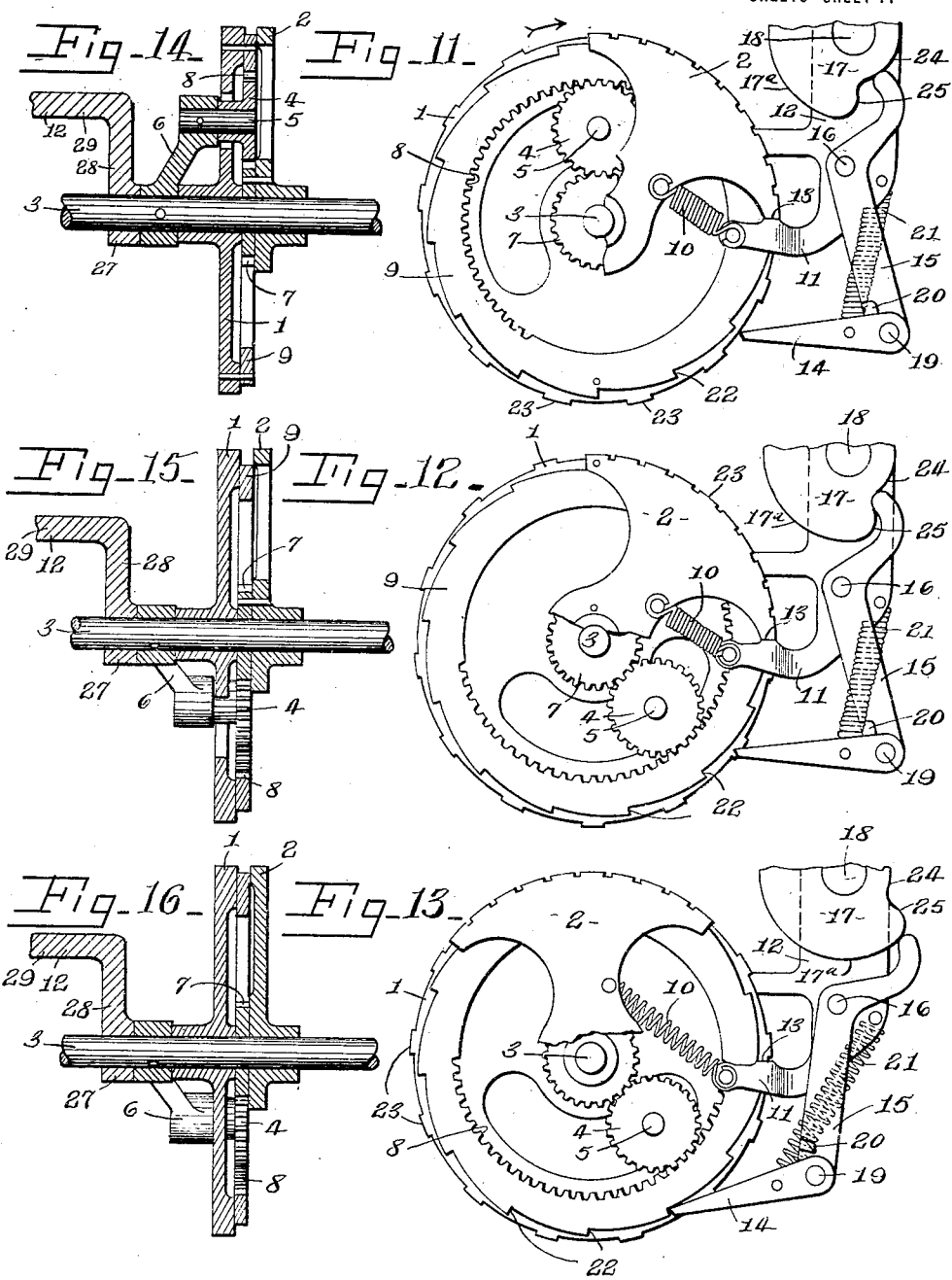

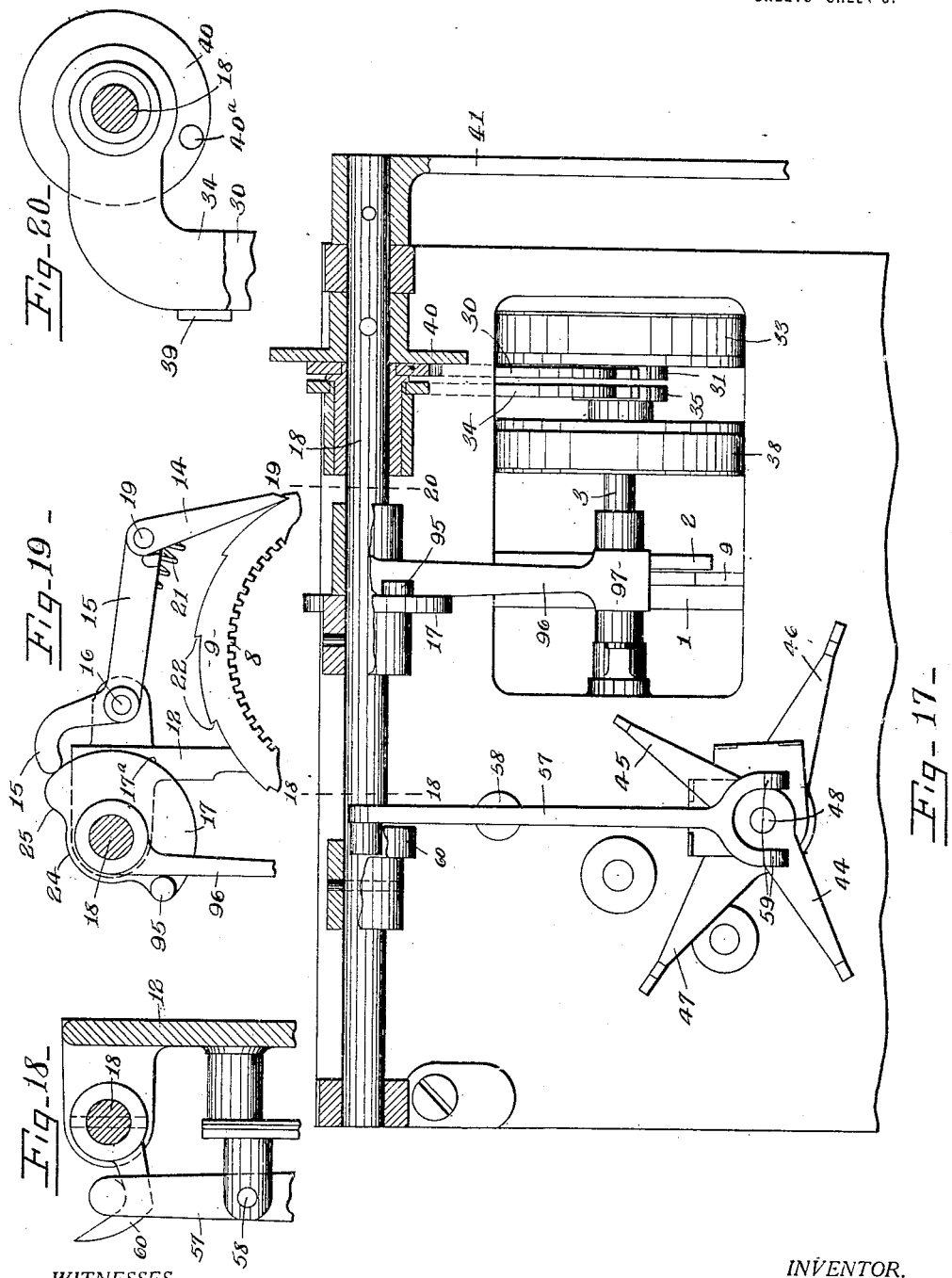

A. T. BROWN.
COMPUTING MACHINE.
APPLICATION FILED APR. 6, 1917.

1,372,334.

Patented Mar. 22, 1921.
9 SHEETS—SHEET 9.

WITNESSES:

INVENTOR.
Alexander T. Brown
BY
Parsons & Bidell
ATTORNEYS.

UNITED STATES PATENT OFFICE.

ALEXANDER T. BROWN, OF SYRACUSE, NEW YORK.

COMPUTING-MACHINE.

1,372,334.  Specification of Letters Patent.  Patented Mar. 22, 1921.

Application filed April 6, 1917. Serial No. 160,091.

*To all whom it may concern:*

Be it known that I, ALEXANDER T. BROWN, a citizen of the United States, and a resident of Syracuse, in the county of Onondaga and State of New York, have invented a certain new and useful Computing-Machine, of which the following is a specification.

This invention relates to computing machines, and has for its object a particularly simple and efficient computing mechanism therefor; and it consists in the combinations and constructions hereinafter set forth and claimed. Other objects will appear throughout the specification.

In describing this invention, reference is had to the accompanying drawings, in which like characters designate corresponding parts in all the views.

Fig. 3 is an end elevation looking to the left in Fig. 1.

Fig. 4 is a plan view of the machine, the top plate and parts carried thereby, and also parts of the frame being removed.

Fig. 5 is an opposite end elevation to that seen in Fig. 3, the same being partly in section, and parts being omitted.

Fig. 6 is a vertical sectional view through the controlling mechanism and contiguous parts.

Fig. 7 is a plan view, partly in section, and parts being broken away, of parts seen in Fig. 6.

Fig. 8 is an enlarged sectional view of the differential gearing forming part of the controlling mechanism.

Figs. 9 and 10 are detail fragmentary views of parts of the differential mechanism shown in Fig. 8.

Fig. 11 is an elevation partly broken away, of the recording wheels and contiguous parts, showing the positions thereof at the start of the computing operation.

Fig. 12 is a view similar to Fig. 11, showing the position of the parts when one of the recording wheels has been actuated and before the setting back of said wheels.

Fig. 13 is a view similar to Fig. 12, showing the position of the parts after the setting back operation has taken place.

Figs. 14, 15 and 16 are vertical sectional views taken centrally of Figs. 13, 14 and 15 respectively.

Fig. 17 is a plan view of the machine, the top plate being removed, part of the controlling mechanism being also removed, the stop arms being shown as in one of their operative positions, and the cam shaft and contiguous parts being shown in section.

Fig. 18 is a sectional view taken on line 18—18, Fig. 17.

Figs. 19 and 20 are sectional views taken on line 19—20, Fig. 17, and looking in opposite directions.

Figs. 21, 22 and 23 are developed views of the periphery of the type wheels showing the relative positions thereof during a particular computing operation.

Figs. 24, 25 are detail views of the spring barrels and contiguous parts forming part of the actuated mechanism.

Figs. 26, 27 are vertical sections taken centrally on Figs. 24 and 25 respectively.

Figure 1:
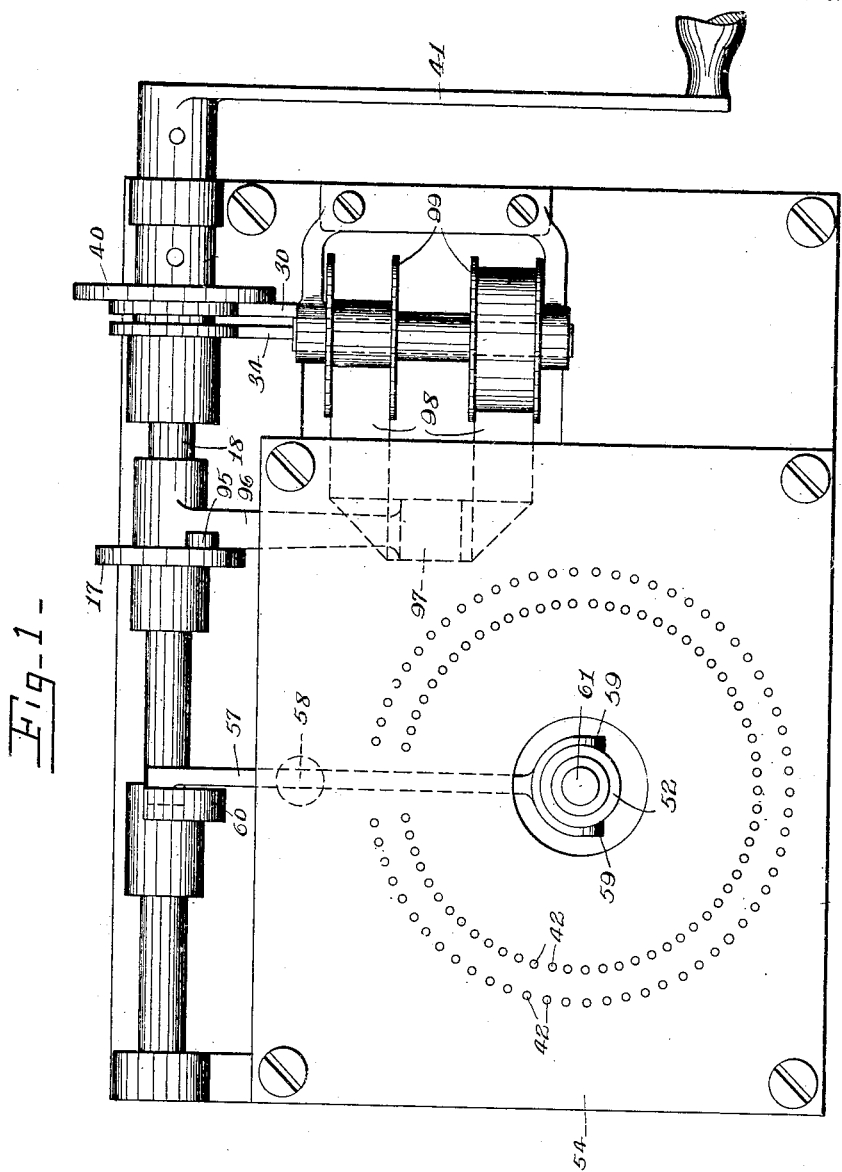
Figure 1 is a plan view of this computing machine.

This computing machine comprises, generally, recording elements, controlling mechanism for governing the setting of the recording elements, and mechanism for actuating the recording elements an amount determined by the controlling mechanism.

The invention includes, generally, recording elements of different denominations, mechanisms for actuating one of said elements, means for controlling the actuation of said element by said mechanism, and mechanism for additionally actuating said element and actuating the other element a proportionate amount, that is, an equal amount in the terms of the units of the latter element. In the illustrated form of my invention, the element of higher denomination is first actuated an amount determined by the controlling mechanism and the element of higher denomination is then additionally actuated and the additional actuation is transmitted proportionally to the element of lower denomination. As the machine illustrated herein is for computing and recording elapsed time, the element of higher denomination registers hours and that of lower order registers fractions of hours and preferably decimal fractions; and any fraction of an hour first set in the hour element is transferred in terms of tenths to the fraction recording element. Hence, a one-half hour or one-half of a space on the hour element is transferred into five spaces to the demical recording element.

In this embodiment of my invention, the actuating and controlling mechanisms operate one recording element to set therein the amount to be computed including the fractional amount to be transferred, the mechanism for additionally actuating said element then operates to move said element a fractional amount to bring the even number of units to the recording or printing line and to proportionally advance the other element. In other words, when the amount includes a fraction of a unit of the wheel of higher denomination, or the hour wheel, the advance of the hour wheel is stopped between two of the printing points on the wheel (this point being short of the whole number to be recorded instead of beyond said number, for the reason to be hereinafter explained) and said element is thereafter additionally advanced to aline the whole number type with the printing line, and the other element proportionately advanced to aline the fraction type with the printing line. In this form of my invention, the advance movement of the wheels is in opposite directions.

1, 2, Figs. 2, 4, and Figs. 11 to 18, inclusive, are the recording elements which are shown as wheels loosely mounted on a shaft 3 actuated, as will be hereinafter described, the wheel 1 being a complete wheel and carrying printing characters on its periphery from 0 to 12 inclusive representing hours; and the wheel 2 being usually a segment loosely mounted on the shaft 3 at the side of the wheel 1 and having characters on its periphery from 0 to 9 inclusive, representing decimal fractions of hours.

This machine is of the same character as that forming the subject-matter of my pending application, Sr. No. 24,672, filed Apr. 29, 1915, in which the computing is done not by adding the used units or elapsed time, but by subtracting the unelapsed time from the total capacity of the recording wheels. As this machine computes time the capacity of the machine is twelve hours and the wheels normally stand with the 12 type of the wheel 1 and the 0 type of the wheel 2 at the printing line; and the advance movement of the wheel 1 is in a reverse direction with respect to the order of the type on the hour wheel 1. That is, during the advance of the wheel 1 the numbers pass the printing line in 12, 11, 10, 9, 8, etc., order, instead of in 0, 1, 2, 3, 4 order. The advance of the wheel 2 is in a direction opposite to that of the wheel 1 and the 0 type is normally at the printing line, and the numerals thereof pass the printing line in 0, 1, 2, 3 order. Hence if $8\frac{1}{2}$ hours elapsed are to be computed, the hour wheel starts from 12, and the unelapsed time numerals of 12, 11, 10, 9, pass the printing line with the half-way point of the space between 9 and 8 at the printing line, so that the entire amount of $8\frac{1}{2}$ hours elapsed time or $3\frac{1}{2}$ hours unelapsed time is set in the hour wheel. The wheel 1 is now additionally advanced by the mechanism for that purpose, to subtract the fraction $\frac{1}{2}$ from the total capacity of 12 hours, or add $\frac{1}{2}$ hour to the unelapsed time of $3\frac{1}{2}$ hours making it 4 hours, so that the numeral 8 is brought to the printing line A—A, and the wheel 2 is advanced proportionately in a direction opposite to the advance of the wheel 1 from the 0 to the 5 numeral.

From the foregoing, it will be obvious that the entire amount to be computed as $8\frac{1}{2}$ hours elapsed time or $3\frac{1}{2}$ hours unelapsed time is first set in the hour wheel and then the wheel 1 additionally actuated to eliminate any fraction therein, and the fraction wheel 2 advanced to receive such fraction, it receiving the fraction in terms of decimals as 5.

The means for actuating the wheels 1, 2 comprises the shaft 3 and its driving means, and a planetary pinion 4 mounted on a spindle 5 carried at the end of the crank arm 6 mounted on and rotatable with the shaft 3, a rack associated with the wheel 2 as a sun gear 7, and a rack 8 associated with the wheel 1, and here shown as formed on the inner side of a ring 9 secured on the face of the wheel 1 and contiguous with the wheel 2. When the shaft 3 is initially actuated, the crank arm 6 is rocked toward the rear of the machine, that is, to the right, Figs. 3, 11, 12 and 13, thereby causing the pinion 4 to travel planetarily, so that it tends to actuate the wheel 1 in a rearward direction, that is, in the direction of the arrow Fig. 11. However, the advance movement of the wheel of lower denomination, that is, the wheel 2 which advance movement is in the reverse direction from the advance movement of wheel 1, is normally yieldingly resisted by suitable means as a spring 10, connected at one end to said wheel and at its other end to a suitable bracket 11 supported by the main frame 12 of the machine, and the movement of the wheel 2 in a retrograde direction is prevented by a fixed stop, or shoulder 13 on said bracket 11. Hence, during the initial movement of the shaft 3 and rock arm 6, the wheel 2 is held stationary while the pinion 4 is traveling planetarily about the sun gear 7 and also rotating or acting as a compensating pinion, so that the wheel 1 is advanced by the rotation of the pinion 4 and also by the planetary movement of said pinion 4. The amount of movement of the shaft 3 and parts actuated thereby is determined by the controlling means to be described. During this actuation of the wheel 1, the even amount to be computed and the fractional amount, is set in said wheel 1.

The mechanism for additionally actuating the wheel 1, and for actuating the wheel 2, includes ratchet teeth associated with the wheel 1, and a pawl 14 carried by an actuating part as a lever 15 pivoted between its ends at 16 to the bracket 11, said lever having one arm thereof coacting with a cam 17 mounted on the main shaft 18, and carrying on its other arm the pawl 14 which is pivoted at 19 thereto. The pivotal movement of the pawl is limited in one direction by a shoulder 20 on the lever 15 and yielding movement of the pawl is permitted during the operation of the pawl by a spring 21. The ratchet teeth 22 with which the pawl 14 coacts are conveniently provided on the periphery of the ring 9 on the wheel 1. There is one ratchet tooth for each printing character 23 on the periphery of the wheel 1.

Obviously, rocking of the shaft 18 over to the right in Figs. 11 to 15 inclusive, causes the cam 17 to rock the lever 15 in such direction as to carry the pawl 14 into engagement with the ratchet teeth 22.

The means for transferring the additional movement of the wheel 1 effected by the pawl 14, to the wheel 2, preferably includes a part of the means for actuating the wheel forwardly, as the pinion 4, which, during the transferring operation, occupies a position similar to that shown in 12 and 13. During the transferring operation this pinion remains stationary, so far as its planetary movement is concerned, but is rotated by the rack 8, so that motion is transmitted through said pinion to the sun gear 7, which rotates about the shaft 3 to the right Figs. 12 and 13 against the action of the spring 10 and moves the wheel 2 in its forward direction. The pinion multiplies the retrograde motion of the rack 8, the ratio of gearing being such that a single complete movement of the wheel 1 by the pawl 14 actuates the wheel 2 to the limit of its movement, that is moving the wheel 1 one step moves the wheel 2 a proportionate amount of ten of its steps from 0 to 9 inclusive, and transfers .9 hours to the wheel 2. If, however, the fractional amount set in the wheel 1 is for instance ½ hour, the wheel 2 will be actuated but half of its movement and the pawl 14 will slide over one of the ratchet teeth 22, with a lost motion one-half of the length of said tooth. If, for example, referring to Fig. 22, the amount set in the wheel 1 prior to the transferring operation in 8½ hours or 12 less 3½ hours, then the wheel 1 will be additionally advanced one-half of one of the spaces of the teeth 22 bringing the numeral 8 to the reading or the printing line, and the wheel 2 will be set ahead five spaces until the numeral 5 comes opposite the numeral 8 so that the record reads 8.5. With other fractions the pawl 14 slides over one of the ratchet teeth 22 a greater or less distance. If, however, as shown in Fig. 21 an even amount and no fractional part is set in the hour wheel as 10 hours, the pawl 14 will slide the entire length of a ratchet tooth and no motion will be transmitted. The ratchet teeth and pawl therefore constitute a varying lost motion connection.

The shaft 18 actuates the shaft 3 as will be presently described, and the cam 17 on the shaft 18 is timed to actuate the lever 15 after the shaft 3 has been actuated, the lever 14 normally engaging a low concentric portion 24 on the cam 17 and riding up a lift portion 25 after the shaft 3 has been actuated, then onto a high concentric portion $17^a$, Figs. 11, 12, and 13.

Although in this embodiment of my invention the recording elements are shown as wheels and the pinion 4 as a planetary pinion, it will be understood that broadly considered, the pinion 4 is a traveling and rotating pinion meshing with racks connected to recording elements, and that it is not necessary in all embodiments of my invention that the pinion 4 be a planetary pinion or the racks 7 and 8 be concentric or curved. Furthermore, it will be noted that the pinion 4 is utilized not only as part of the actuating mechanism but also serves to perform a function in the operation of transferring mechanism, so that additional mechanism for advancing the wheel 2 is unnecessary.

The shaft 3 is journaled in suitable bearings 26, 27 in frame 12, the latter being carried by a bracket 28 depending from a horizontally extending arm 29 of the frame, said bearing 27 being located between the sides of the frame. The means for driving the shaft 3 or for controlling the driving thereof includes the shaft 18, a segment 30 mounted on the shaft 3, Figs. 2, 3 and 4, a pinion 31 meshing with the segment 30 and loosely mounted on the bearing 26 of shaft 3, a spring 32 located in a stationary barrel 33 fixed to the frame, and resisting movement of the shaft 18 by its handle, a segment 34 loosely mounted on the shaft 18 and meshing with the pinion 35, the hub of which is keyed at 36 to the shaft 3, and a spring 37 tending to turn the shaft forwardly and being located within a barrel 38 fixed to the hub of the gear 35 and to the barrel 38 so that the shaft 3 is normally under the tension of the spring 37. This spring 37 is weaker than the spring 32 and the latter serves to return all parts to their starting positions when the handle is released.

The segments 30 and 34 are arranged side by side, and the segment 30 is formed with the shoulder 39, Fig. 20, on the rear side thereof, which engages the rear edge of the segment 34. As the spring 37 tends to actuate the shaft 3, the segment 34 is held against the shoulder 39. Hence, the shaft 3 is held from actuation by the shoulder 39 on the segment 30 which is under tension of the stronger spring 32. The segment 30 is not keyed directly to the actuating shaft 18 but is connected to a disk 40 thereon by lost motion connection consisting of a shoulder 40$^a$ on said disk which presses against the segment 30 during the forward movement of the shaft 18, and which is normally spaced apart from the segment. So far as this invention is concerned, the segment 30 may be considered as fixed to the shaft 18. The shaft 18 is provided with a handle 41, and when this handle is operated or pushed downwardly from its position shown in Fig. 3, the shaft 18 is rocked forwardly, and the segment 30 moved downwardly rotating the gear 31 and additionally tensioning the spring 32. During such movement of the segment 30, the shoulder 39 thereon moves rearwardly gradually releasing the holding effect on the segment 34, and permitting the spring 37 to act, and to actuate the shaft 3 and the crank arm 6 which carriers the planetary pinion 4, and hence to actuate the recording wheel 1 in a forward direction. When the handle 41 is released the spring 32 which is stronger than the spring 37 returns the parts to their starting positions.

From the foregoing it will be seen that there are two sets of power transmitting parts between the main shaft 18 and the recording element 1, one set operating to initially move the element in a forward direction, and the other operating to additionally move said element in a forward direction, and both sets operating to successively advance the elements 1, 2. This actuating mechanism for the shaft 3, and the controlling mechanism to be described, and the operation thereof, are no part of this invention but constitute the subject matter of my pending application, Sr. No. 24672, filed Apr. 29, 1915, and the operating and controlling mechanisms are only of importance herein in order that the operation of the recording elements may be understood.

The controlling mechanism comprises keys or stops 42 mounted above the top plate 43 of the machine in two concentric circular rows or series, two pairs of controlling arms 44, 45 and 46, 47 in the paths of which certain selected stops are movable downwardly below the top plate, vertically extending shafts 48, 49, 50, 51 Figs. 3, 5, and 6, on the upper ends of which the controlling arms are mounted, and differential gearing between said shafts and the shaft 3. The series of stops 42 are supported by a movable carriage 52 Figs 1 and 5, which includes a perforated plate 53 through which the lower ends of the stops 42 extend, the stops being guided at their upper ends in a perforated plate 54 which is supported by posts 55 rising from the top 43. The intermediate portions of these stops 42 are enlarged at 56 providing shoulders which rest on the plate 53 and which abut against the under side of the plate 54. The portions of the stops projecting through the plate 53, move when permitted, as hereinafter described, through perforations in the top plate 43 downwardly into the paths of the arms 44, 45, 46, 47. The carriage 52 moves downwardly by gravity, and is moved upwardly into its position shown in Fig. 5, by means of a lever arm 57 pivoted at 58 between its ends and having at one end a fork 59 engaging an annular groove in the hub of the carriage 52, and having at its other end means for engaging a cam 60 on the shaft 18 which cam controls the movement of the carriage 52. The carriage 52 slides vertically on a post 61 arising from the top plate 43.

Figure 28:
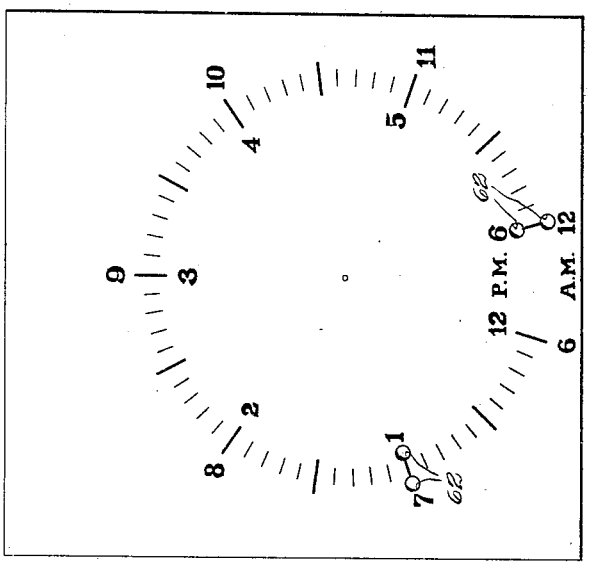

The stops 42 which are permitted to move into the paths of the controlling arms 44, 45, 46 and 47, are determined by a card such as shown in Fig. 28 which has a circular series of graduations thereon, and numbers on the outer side of the graduations representing the hours of from 6 a. m. to 12 m. or the morning work hours, and numbers on the inner side of the graduations running from 12 m. to 6 p. m.

The holes 62 are punched in the card opposite the graduations showing the time at which a workman enters in the morning, leaves at noon, enters in the afternoon and leaves at night. These perforations are usually made by a time recorder for that purpose, but so far as this invention is concerned, they may be made by hand.

Figure 2:
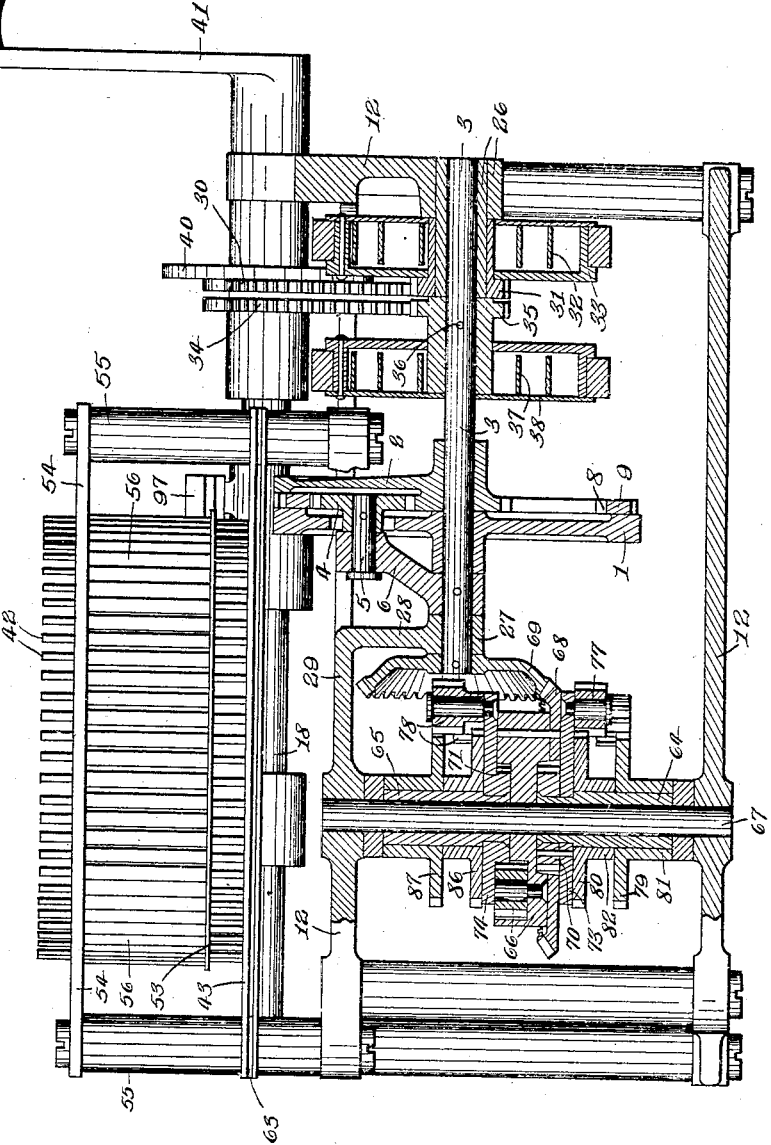
Fig. 2 is a vertical transverse sectional view thereof, partly in elevation.
Figure 29:
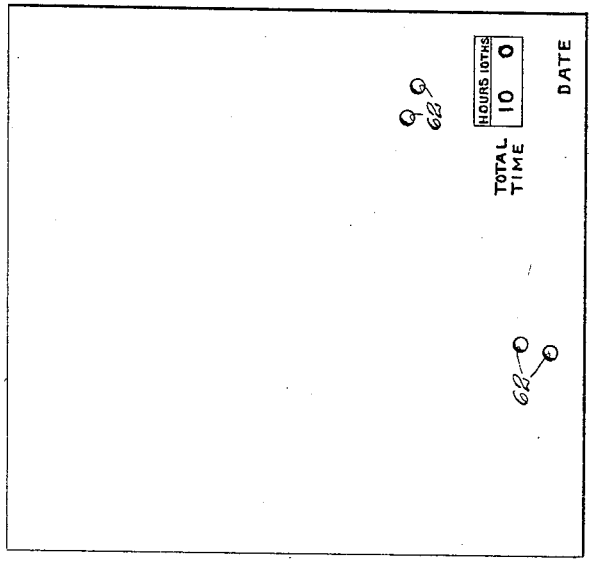
Figs. 28 and 29 are opposite face views of one of the cards used in this machine.

The perforated card is placed in the card slot or receiver 63 Fig. 2, located below the plate 43, and when the series of stops 42 are permitted to move downwardly by gravity upon the actuation of the shaft 18 as will be hereinafter described, the stops 42 that come into alinement with the holes in the perforated card in the receiver 63, pass through said holes into the paths of the controlling arms 44, 45, 46, and 47, and the remaining stops are limited in their movement by the card, the controlling arms passing over the graduations of the card representing the unelapsed time and the elapsed time spaces being untraversed by the controlling arms, hence the unelapsed time is added and the wheel 1 turned to subtract the unelapsed time from the total capacity of the wheel 1 to give the elapsed time. The differential gearing between the nested shafts 48, 49, 50 and 51 include shaft sections 64, 65, Figs. 2, 6, and 8, differential gearing 66 connecting said shaft sections 64, 65 and branches between the shaft sections 64, 65 and each part of controlling arms 44, 45 or 46, 47, the branches including differential gearing.

The shaft sections 64 and 65 are sleeves rotatable on a vertical shaft 67 located near the nested shafts. The differential gearing 66 is provided with a bevel gear 68 which meshes with the bevel gear 69 on the shaft 3.

The opposing gears 70, 71 of the differential gear 66 between the shaft sections 64, and 65, in addition to meshing with the compensating pinions 72 are secured to flanges or disks 73, 74, Figs. 2, 6, 8, 9, and 10, which constitute the driving elements of the differential gearing 75, 76 in the branches. Said disk 73 carries the compensating pinions 77 of the branch differential gearing 75, and the disk 74 carries the compensating gears 78 for the branch differential gearing 74. The differential gearing 75 in addition to the pinions 77 includes opposing gears 79, 80 carried by hollow shaft sections or hubs 81, 82 which are loosely mounted on the main shaft section 64. Said gears 79, 80 mesh in the ordinary manner with the compensating pinions 77 and are also connected to gears 83, 84 mounted respectively on the nested shafts 48, 49 on which the controlling arms 44, 45 are mounted. The gear 80 meshes directly with the gear 84 and the gear 79 meshes with an idler 85 which meshes with the gear 83. Hence, the shafts 48, 49 are actuated in opposite directions.

The differential gearing 76 in addition to the compensating pinions 78 includes opposing gears 86, 87 carried by hollow shaft sections or hubs 88, 89 loosely mounted on the main shaft section 65. These gears 86, 87 mesh with the compensating pinions 78, and are also connected to gears 90, 91 mounted respectively on the nested shafts 50, 51, the gear 86 meshing directly with the gear 90 and the gear 87 meshing with an idler 92 which meshes with the gear 91. Hence, the nested shaft sections 50, 51 and the controlling arms 46, 47 rotate in opposite directions. The idlers 85, 92, Fig. 5, are mounted on a shaft 93. In the operation of the controlling mechanism, the controlling arms 44, 45, 46, 47 start from a common starting point located in a position corresponding to the space between the 6 a. m. and the 12 noon graduations on the card, and these arms separate varying distances as, for instance, is shown in Fig. 17.

When the card is placed in the card receiver 63 and four of the stops 42 drop through four of the holes in the card into the paths of the controlling arms 44, 45, 46, 47 and the handle 41 is operated to rotate the shaft 3, the gear 69 on said shaft 3 rotates the gear 68 of the main differential 66, and all the shaft sections and all the differential gears rotate as a unit. As soon as one of the controlling arms 44, 45, 46, 47 engages a stop as for instance, the arm 45, it and its nested shaft 49, are held from rotation thus stopping the hollow hub or shaft section 82 and gear 80 of the differential gearing 75 from rotation so that the compensating pinions 77 of this differential gearing 75 will now be rotated on their own axes and all the other shaft sections will be rotated with increased speed carrying the arms 44, 46, 47 toward the three remaining stops. Whenever another of the controlling arms engages a stop the remaining arms are actuated with still greater speed toward their stopping points, and whenever the third arm engages its stop, the fourth arm is actuated with still greater speed toward its destination, and when it engages its stop, the shaft 3 is held from rotation and the recording wheel 1, has set therein the total amount computed, that is, in the example, 8½ hours elapsed time and 3½ hours unelapsed.

The additional advance of the wheel 1, and the transferring operation of any fractional part of a unit, by means of the mechanism including the parts 17, 15, 14, and 22, Figs. 11 to 13 now takes place. In the example illustrated on the card Fig. 28 on all four of the stop arms 44, 45, 46, 47 would come to rest at the same time, as the holes in the card are opposite each other.

The operation of this controlling mechanism is of no importance so far as this invention is concerned and it is only necessary to bear in mind that it controls the extent of movement of the recording wheel 1. For a full description of the operation of this controlling mechanism reference is had to my pending application referred to.

As seen in Fig. 17, the cam 17 is provided with a shoulder 95 which moves into engagement with the upper side of a hammer 96 having a hub loosely mounted on the shaft 18 and also having a platen head 97 for engaging and pressing the card in the card receiver against the type of the recording wheels at the printing line. A suitable inking ribbon 98 is interposed between the card and the type wheels. The ribbon winds off of one spool 99 onto another spool 99. The printing mechanism is also described in my pending application referred to.

In operation, when the perforated card is placed in the card receiver and the handle 41 operated, the cam 60, Fig. 5, moves to the right permitting the stops 42 to move downwardly so that certain of them can move through the holes in the card into the paths of the controlling arms 44, 45, 46 and 47. During this part of the movement of the shaft 18 the lost motion previously referred to between the segment 30 and the disk 40 is taken up, so that continued operation of the handle moves the segment 30 rearwardly carrying the shoulder 39 thereof away from the rear edge of the segment 34 so that said segment 34, is free to move rearwardly actuating the pinion 35 and the shaft 3. This movement of the segment 30 also additionally tensions the returning spring 32. The shaft 3 through the arm 6 and the planetary pinion 4, actuates the recording wheel 1, in a forward direction. It also actuates the differential gearing of the controlling members until all the controlling arms 44, 45, 46, 47 come to rest, whereupon the shaft 3 is held from rotation, and the entire amount of the unelapsed time including any fractional parts of a unit is set in the recording wheel 1. Continued movement of the handle and shaft 18 forwardly or downwardly causes the cam 17 and shaft 18 to actuate the correcting lever 15 thus additionally actuating the wheel 1 and transferring any fractional part of a unit set in said wheel to the wheel 2 through the pinion 4 which now occupies a position similar to that shown in Fig. 12. At this point the lever 14 has passed the high point or lift 25 of the cam 17 and arrives at the outer concentric portion of said cam, and during this part of the movement of the shaft 18 the hammer 96 is actuated to print the elapsed time on the card by reason of the shoulder 95, Fig. 17, engaging the upper side of the hammer 96. The handle 41, is then released and the spring 32 restores the parts to their starting positions.

Although I have shown this machine as adapted for computing units of time it may be used for various other computations, some of which are outlined in my pending application.

What I claim is:

1. In a computing machine, the combination of recording elements of different denominations, in one of which the entire amount is set, and means for first actuating said element to set the entire amount to be computed therein including units to be transferred to the other recording element, and subsequently in the same operation actuating both elements to transfer to the latter, such units first set in the former element, substantially as and for the purpose specified.

2. In a computing machine, the combination of recording elements of different denominations, in one of which the entire amount computed is set, means for first moving said element to set the entire amount therein, including units of the other element, and means for subsequently transferring in the same operation such units proportionately from the former element to the latter element, substantially as and for the purpose set forth.

3. In a computing machine the combination of recording elements of different denominations, in the one of which of higher denomination, the entire amount computed is first set, means for first actuating the element of higher denomination a predetermined amount to set the entire amount therein, including the fractional amount to be transferred to the element of lower denomination, and for subsequently in the same operation, advancing the wheel of lower denomination a proportionate amount to set the fractional amount therein in terms of the element of lower denomination, substantially as and for the purpose described.

4. In a computing machine, recording elements of different denominations, in one of which of higher denomination the entire amount to be computed is set, means for first moving said element of higher denomination to set the entire amount therein, including fractional amount to be transferred to the element of lower denomination and subsequently reversing the movement of the element of higher denomination to eliminate the fractional amount therein and transfer such reverse movement proportionately to the element of lower denomination in the same operation, substantially as and for the purpose specified.

5. In a computing machine, the combination of recording wheels of different denominations, in one of which the entire amount computed is set, the wheels being formed respectively with an internal and an external rack, a pinion interposed between the racks, means for rotating the wheel in which said amount is set, means for holding the other wheel and means for actuating such other wheel during each operation after the total amount has been first set in the former wheel from rotation when the amount is being set in the former wheel, substantially as and for the purpose described.

6. In a computing machine, recording wheels of different denominations in one of which the entire amount computed is set, ratchet teeth on one wheel and means for rotating said wheel after said amount is set therein, including a pawl coacting with the ratchet teeth and a gear arranged to reverse and to transmit the said movement proportionately to the other wheel, substantially as and for the purpose specified.

7. In a computing machine, the combination of recording elements of different denominations, and means for actuating during each operation first one of said elements and then the other and to additionally move the element first actuated while the element secondly actuated is being moved in its advance direction, substantially as and for the purpose set forth.

8. In a computing machine, the combination of recording elements of different denominations, and means operating during each operation to successively advance the elements in their forward directions and to additionally move one element while the other element is being advanced, substantially as and for the purpose described.

9. In a computing machine, the combination of recording elements of different denominations, actuating mechanism including a main shaft, a train of power transmitting parts between the shaft and one element to actuate said element in its forward direction and to transmit the motion of one element to the other, a second train of power transmitting parts between the shaft and said element to additionally move the same a predetermined distance, said trains being arranged to be brought into operation successively during each operation of the main shaft, and means for preventing the transmission of movement from said element to the other element during the first actuation of the former element in its forward direction, substantially as and for the purpose specified.

10. In a computing machine, the combination of recording elements of different denominations, mechanism for first setting the amount computed including any fraction, in one of said elements, mechanism for additionally moving said element a fractional amount, and advancing the other element a proportional amount and thereby transferring the fractional amount to the latter element, and a common actuator for both of said mechanisms arranged to actuate the same successively during each operation, substantially as and for the purpose set forth.

11. In a computing machine, the combination of recording elements of different denominations, mechanism for setting the amount computed including any fraction, in one element, mechanism for additionally moving said element a predetermined amount, the former mechanism including a part serving to reverse and transmit proportionately the additional movement of said element to the other element, and a common actuator connected to both of said mechanisms to actuate the same successively during each operation, substantially as and for the purpose described.

12. In a computing machine, the combination of recording elements of different denominations, mechanism for moving one element in an advance direction, and for transferring movement of one element to the other element, means for holding the latter element from movement during the advance movement of the former element, mechanism for stopping the former mechanism after the former element has been actuated thereby, mechanism for additionally moving the former element when a fractional amount is set therein, and first and third named mechanisms having a power transmitting part in common, and a common actuator for both of said mechanisms arranged to actuate the same successively during each operation, substantially as and for the purpose specified.

13. In a computing machine, the combination of recording wheels movable about a common axis, the wheels being of different denominations, mechanism for moving one of said wheels in an advance direction to compute the whole amount and any fractional part therein, and for transferring movement of said wheel to the other wheel, means for holding the latter wheel from movement during the advance actuation of the former wheel by said mechanism, and mechanism for additionally moving the former wheel when a fractional amount is contained therein, substantially as and for the purpose set forth.

14. In a computing machine, the combination of recording elements of different denominations, and mechanism for computing the whole amount including a fractional part of a unit in the element of higher denomination and for transferring a fractional amount of a unit of the element of higher denomination proportionately to that of lower denomination, substantially as and for the purpose described.

15. In a computing machine, the combination of recording elements of different denominations, mechanism for actuating the element of higher denomination to compute in said element the whole amount including a fractional part of a unit of the element of higher denomination, and for transferring movement of said element proportionately to that of lower denomination an amount equal to the fractional part of a unit therein, and means for holding the element of lower denomination from movement while the former element is being actuated in a forward direction by the first named mechanism, substantially as and for the purpose specified.

16. In a computing machine, the combination of recording wheels movable about a common axis, one being a segment, mechanism for actuating the complete wheel in one direction to set the entire amount to be computed including any fraction of a unit of the complete wheel, and for reversing and transmitting movement of the complete wheel, proportionately to the segment, in a direction opposite to the movement of said wheel, means for holding the segment stationary during the said movement of the complete wheel by said mechanism, mechanism for additionally moving the complete wheel when a fraction of a unit is contained therein, and means for holding the first mentioned actuating mechanism for the complete wheel stationary during the additional movement of the complete wheel, substantially as and for the purpose set forth.

17. In a computing machine, the combination of recording elements, mechanism for actuating one of said elements to compute therein the entire amount, including a fraction of a unit of said element, mechanism for additionally moving the said element an amount equal to the fractional unit set in said element, the former mechanism serving to transmit the additional movement of said element to the other element including planetary gearing, and means for holding the planetary gearing from planetary movement during the operation of the second-named mechanism, and a common actuator for both of said mechanisms connected thereto to operate the same successively during each movement of the actuator, substantially as and for the purpose described.

18. In a computing machine, the combination of recording elements of different denominations, mechanism connecting said elements including a rotating traveling pinion, racks associated respectively with said elements and meshing with the pinion, means for actuating the pinion to cause the same to travel, means for holding one of said elements from movement during the traveling of the pinion, hence holding the rack associated with said element from movement, whereby a rotary movement of the traveling pinion is effected, multiplied and transferred to the other element, controlling mechanism for additionally moving the latter element a predetermined amount after the traveling movement of the pinion is limited and thereby causing the pinion to rotate without traveling and hence transfer its rotative movement to the former element and an actuator common to both of said mechanisms and connected thereto to actuate the same successively during each operation of the common actuator, substantially as and for the purpose specified.

19. In a computing machine, the combination of recording elements including wheels of different denominations arranged side by side, the wheels being formed respectively with an internal rack and a sun gear, actuating mechanism including a planetary pinion meshing with the sun gear and the rack, means for normally holding from movement the wheel provided with the sun gear, controlling means for limiting the traveling of the pinion, and means for additionally moving the wheel provided with the internal rack, a predetermined amount, and thereby actuating the internal rack whereby rotative motion is transmitted to the sun gear through the stationary planetary pinion, substantially as and for the purpose set forth.

20. In a computing machine, the combination of recording elements, actuating mechanism connected to said elements and tending to actuate the same, said mechanism including a planetary pinion interposed between the elements, one of said elements being free to advance, a stop preventing retrograde movement of the latter element in one direction, means yieldingly resisting movement of the latter element in the opposite direction, controlling means for limiting the planetary movement of said pinion, and mechanism to additionally move the former element after the planetary movement of said pinion is limited, substantially as and for the purpose described.

21. In a computing machine, the combination of recording elements of different denominations, movable in opposite directions, mechanism for setting the amount to be computed in one element, including compensating means between the elements, a stop preventing movement of the other element, in one direction, means yieldingly resisting movement of the latter element in the opposite direction, controlling means for limiting the operation of said mechanism, mechanism for additionally moving the former element and thereby actuating the latter element through the compensating means against the influence of the yielding means, and an actuator common to both mechanisms and connected thereto to operate the same successively during each operation of the common actuator, substantially as and for the purpose set forth.

22. In a computing machine, the combination of recording elements of different denominations, mechanism for setting in one element the amount to be computed including any surplus amount to be transferred to the other unit, said mechanism including compensating means between the elements, means for normally holding the other element from movement in either direction, controlling means for limiting the operation of said mechanism, mechanism for actuating the former element an amount proportionate to the surplus set in said former element and thereby actuating the latter element through the compensating means, the last mentioned mechanism including a varying lost motion connection, and an actuator common to both of said mechanisms and connected thereto to operate the same successively during each operation of the actuator, substantially as and for the purpose described.

23. In a computing machine, the combination of recording elements of different denominations, mechanism for setting in one element the amount to be computed including any surplus amount to be transferred to the other unit, said mechanism including compensating means between the elements, means for normally holding the other element from movement in either direction, controlling means for limiting the operation of said mechanism, and mechanism for actuating the former element an amount proportionate to the surplus set in said former element and thereby actuating the latter element through the compensating means, the last mentioned mechanism including a varying lost motion connection, the amount of said lost motion being determined by the surplus in the former element, substantially as and for the purpose described.

24. In a computing machine, the combination of recording elements of different denominations, mechanism for setting in one element the amount to be computed including any surplus amount to be transferred to the other unit, said mechanism including compensating means between the elements, means for normally holding the other element from movement in either direction, controlling means for limiting the operation of said mechanism, and mechanism for actuating the former element an amount proportionate to the surplus set in said former element and thereby actuating the latter element through the compensating means, the last mentioned mechanism including ratchet teeth associated with the former element and a reciprocating pawl coacting with the ratchet teeth, each ratchet tooth being equivalent to a single advance step of the former element and all the ratchet teeth combined being equal to all the steps of the latter element, substantially as and for the purpose specified.

25. In a computing machine, the combination of recording wheels of different denominations arranged side by side and being provided respectively with an internal rack and an external rack, said racks being concentric with the axis of the wheels, one wheel being provided with ratchet teeth, one for each of the recording characters thereof, means for actuating the wheels including a planetary pinion meshing with said racks, means for yieldingly preventing movement of the other wheel in one direction, a stop for preventing movement of the latter wheel in the opposite direction; controlling means for limiting the planetary movement of the pinion after the former wheel has been actuated by said pinion, and mechanism for additionally actuating the former wheels including a pawl coacting with said ratchet teeth, substantially as and for the purpose set forth.

26. In a computing machine, the combination of a driving shaft, recording elements loosely mounted on the shaft side by side and being formed respectively with an internal rack and an external rack, a support mounted on, and rotatable with, the shaft and carrying a planetary pinion meshing with said racks, means for normally preventing one wheel from movement in one direction, means for yieldingly preventing movement thereof in the opposite direction, controlling means for limiting the movement of the support, and means for moving the other of said wheels after the same has been moved by the support and the planetary pinion, substantially as and for the purpose described.

In testimony whereof, I have hereunto signed my name, at Syracuse, in the county of Onondaga, and State of New York, this 29th day of March, 1917.

ALEXANDER T. BROWN.

It is hereby certified that in Letters Patent No. 1,372,334, granted March 22, 1921, upon the application of Alexander T. Brown, of Syracuse, New York, for an improvement in "Computing-Machines," errors appear in the printed specification requiring correction as follows: Page 6, line 107, claim 5, after the word "wheel". insert the words *from rotation when the amount is being set in the former wheel;* same. page and claim, lines 110–111, strike out the words "from rotation when the amount is being set in the former wheel"; and that the said Letters Patent should be read with these corrections therein that the same may conform to the record of the case in the Patent Office.

Signed and sealed this 17th day of May, A. D., 1921.

[SEAL.]

T. E. ROBERTSON,
*Commissioner of Patents*

Cl. 234—35.